US010716000B2

(12) United States Patent
Roeland et al.

(10) Patent No.: US 10,716,000 B2
(45) Date of Patent: Jul. 14, 2020

(54) PROTECTING WLCP MESSAGE EXCHANGE BETWEEN TWAG AND UE

(71) Applicant: Telefonaktiebolaget LM Ericsson (publ), Stockholm (SE)

(72) Inventors: Dinand Roeland, Sollentuna (SE); Vesa Lehtovirta, Espoo (FI); Karl Norrman, Stockholm (SE); Stefan Rommer, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/826,003

(22) Filed: Nov. 29, 2017

(65) Prior Publication Data

US 2018/0084417 A1  Mar. 22, 2018

Related U.S. Application Data

(63) Continuation of application No. 14/442,117, filed as application No. PCT/EP2015/058140 on Apr. 15, 2015, now Pat. No. 9,848,321.

(Continued)

(51) Int. Cl.
*H04W 12/04* (2009.01)
*H04W 12/00* (2009.01)
(Continued)

(52) U.S. Cl.
CPC ......... *H04W 12/04* (2013.01); *H04L 63/0281* (2013.01); *H04W 12/0017* (2019.01);
(Continued)

(58) Field of Classification Search
CPC . H04W 12/04; H04W 12/0017; H04W 12/02; H04W 12/10; H04W 84/12; H04L 63/0281; H04L 63/162; H04L 63/0892
See application file for complete search history.

(56) References Cited

U.S. PATENT DOCUMENTS 6,654,792 B1 * 11/2003 Verma ................ H04L 12/66
                                                 709/208
7,373,508 B1 *  5/2008 Meier ................. H04L 9/08
                                                 380/270
(Continued)

OTHER PUBLICATIONS

Extensible Authentication Protocol (EAP) Key Management Framework RFC 5247 (Aug. 2008).*

(Continued)

*Primary Examiner* — Sharon S Lynch
(74) *Attorney, Agent, or Firm* — Baker Botts, LLP

(57) ABSTRACT

A method of protecting WLAN Control Protocol (WLCP) message exchange between a Trusted WLAN Access Gateway (TWAG) (112) of a Trusted WLAN Access Network (TWAN) (110) and a User Equipment (UE) (101) are provided. The method comprises deriving, by an Authentication, Authorization, and Accounting, (AAA) Server (103) of an Evolved Packet Core (EPC) network which is interfaced with the TWAN, and by the UE, a Master Session Key (MSK) and an Extended MSK (EMSK), sending, from the AAA Server to a Trusted WLAN AAA Proxy (TWAP) (113) of the TWAN and an Access Point (AP) (111) of the TWAN, the MSK or a key derived from at least the MSK, and deriving, by the TWAN or by the AAA Server, and by the UE, from the MSK, the EMSK, or the key derived from at least the MSK or the EMSK, a key for protecting the WLCP message exchange. —Corresponding devices, computer programs, and computer program products are further provided.

6 Claims, 7 Drawing Sheets

Related U.S. Application Data

(60) Provisional application No. 61/988,613, filed on May 5, 2014.

(51) Int. Cl.
*H04L 29/06* (2006.01)
*H04W 12/10* (2009.01)
*H04W 84/12* (2009.01)
*H04W 12/02* (2009.01)

(52) U.S. Cl.
CPC ........ *H04L 63/0892* (2013.01); *H04L 63/162* (2013.01); *H04L 2463/061* (2013.01); *H04W 12/02* (2013.01); *H04W 12/10* (2013.01); *H04W 84/12* (2013.01)

(56) References Cited

U.S. PATENT DOCUMENTS

| | | | | |
|---|---|---|---|---|
| 7,810,149 B2* | 10/2010 | Islam | ............. | H04L 45/52 713/150 |
| 8,670,422 B2* | 3/2014 | Lewis | ............. | H04W 80/00 370/310 |
| 9,872,321 B2* | 1/2018 | Roeland | ............. | H04L 12/4633 |
| 2004/0221042 A1* | 11/2004 | Meier | ............. | H04L 12/4625 709/227 |
| 2007/0174436 A1* | 7/2007 | Maekawa | ............. | H04L 12/4633 709/223 |
| 2007/0195804 A1* | 8/2007 | Ijima | ............. | H04L 12/2856 370/401 |
| 2007/0208937 A1* | 9/2007 | Cam-Winget | ............. | H04L 9/0844 713/168 |
| 2008/0267146 A1* | 10/2008 | Lewis | ............. | H04W 80/00 370/338 |
| 2008/0304456 A1* | 12/2008 | Iino | ............. | H04L 12/2856 370/338 |
| 2009/0054037 A1* | 2/2009 | Kaippallimalil | ............. | H04L 63/08 455/411 |
| 2009/0055898 A1* | 2/2009 | Kaippallimalil | ............. | H04L 63/162 726/3 |
| 2009/0080418 A1* | 3/2009 | Koide | ............. | H04L 12/4633 370/389 |
| 2010/0067503 A1* | 3/2010 | Premec | ............. | H04L 45/50 370/338 |
| 2010/0157963 A1* | 6/2010 | Choi | ............. | H04L 12/4633 370/338 |
| 2011/0216743 A1* | 9/2011 | Bachmann | ............. | H04L 63/164 370/331 |
| 2012/0069763 A1* | 3/2012 | Zhao | ............. | H04W 28/24 370/252 |
| 2012/0140719 A1* | 6/2012 | Hui | ............. | H04W 76/00 370/329 |
| 2012/0182929 A1* | 7/2012 | Chen | ............. | H04L 63/1458 370/315 |
| 2012/0275401 A1* | 11/2012 | Sun | ............. | H04W 76/18 370/329 |
| 2012/0294236 A1* | 11/2012 | Watfa | ............. | H04W 76/10 370/328 |
| 2012/0317619 A1* | 12/2012 | Dattagupta | ............. | H04W 12/08 726/4 |
| 2013/0176987 A1 | 7/2013 | Kawamura | | |
| 2013/0288644 A1* | 10/2013 | Schroeder | ............. | H04W 12/06 455/411 |
| 2014/0036807 A1* | 2/2014 | Huang | ............. | H04L 61/2038 370/329 |
| 2014/0071907 A1* | 3/2014 | Roeland | ............. | H04W 76/11 370/329 |
| 2014/0078968 A1* | 3/2014 | Korhonen | ............. | H04W 76/25 370/328 |
| 2014/0078986 A1* | 3/2014 | Kaippallimalil | ............. | H04W 76/10 370/329 |
| 2014/0086226 A1* | 3/2014 | Zhao | ............. | H04W 76/12 370/338 |
| 2014/0133456 A1* | 5/2014 | Donepudi | ............. | H04W 88/10 370/331 |
| 2014/0185603 A1* | 7/2014 | Kaippallimalil | ............. | H04W 12/08 370/338 |
| 2014/0273958 A1* | 9/2014 | Messana | ............. | H04L 63/0884 455/411 |
| 2014/0321328 A1* | 10/2014 | Zuniga | ............. | H04W 8/06 370/254 |
| 2014/0331296 A1* | 11/2014 | Faccin | ............. | H04W 12/06 726/6 |
| 2015/0117425 A1* | 4/2015 | Gupta | ............. | H04W 76/18 370/338 |
| 2015/0282026 A1* | 10/2015 | Gupta | ............. | H04W 76/14 370/331 |
| 2015/0296548 A1* | 10/2015 | Roeland | ............. | H04L 12/4633 370/329 |
| 2016/0165508 A1* | 6/2016 | Jin | ............. | H04W 36/14 370/331 |
| 2016/0219038 A1* | 7/2016 | Stephenson | ............. | H04L 63/0823 |
| 2019/0007791 A1* | 1/2019 | Salot | ............. | H04W 4/021 |
| 2019/0069182 A1* | 2/2019 | John | ............. | H04W 12/08 |

OTHER PUBLICATIONS

Search Query Report from IP.com (performed Mar. 4, 2020).*
Motorola Mobility: "Correcting the reference to IEEE 802.11", 3GPP Draft; S2-141084_CR_80211_REFS, 3RD Generation Partnership Project (3GPP), Mobile Competence Centre; 650, Route Des Lusioles; F-06921 Sophia-Antipolis Cedex; France, vol. SA WG2, No. St. Julian; 20140324-20140328 Mar. 2014 (Mar. 23, 2014) XP0f50804568.
Notification of Transmittal of the International Preliminary Report on Patentability and International Preliminary Report on Patentability (PCT/IPEA/416/409) with Response to Written Opinion, dated Apr. 13, 2016.
3GPP TSG SA WG3 (Security) Meeting #75; Sapporo (Japan); Source: Qualcomm Incorporated; Title: Security Analysis of WLCP (S3-140812) May 12-16, 2014.
Improved Extensible Authentication Protocol Method for 3rd Generation Authentication and Key Agreement (EAP-AKA); Network Working Group; Request for Comments: 5448; Updates: 4187; Category: Informational; J. Arkko et al. May 2009.
PCT International Search Report for International application No. PCT/EP2015/058140; dated Jul. 7, 2015.
3GPP TSG SA WG3 Meeting #76; Sophia Antipolis, France; Change Request (S3-142343) Aug. 25-29, 2014.
3GPP TS 23.402 V12.3.0; Technical Specification; 3rd Generation Partnership Project; Technical Specification Group Services and System Aspects; Architecture enhancements for non-3GPP accesses (Release 12) Dec. 2013.
3GPP TS 33.402 V12.3.0; Technical Specification; 3rd Generation Partnership Project; Technical Specification Group Services and System Aspects; 3GPP System Architecture Evolution (SAE); Security aspects of non-3GPP accesses (Release 12) Mar. 2014.

* cited by examiner

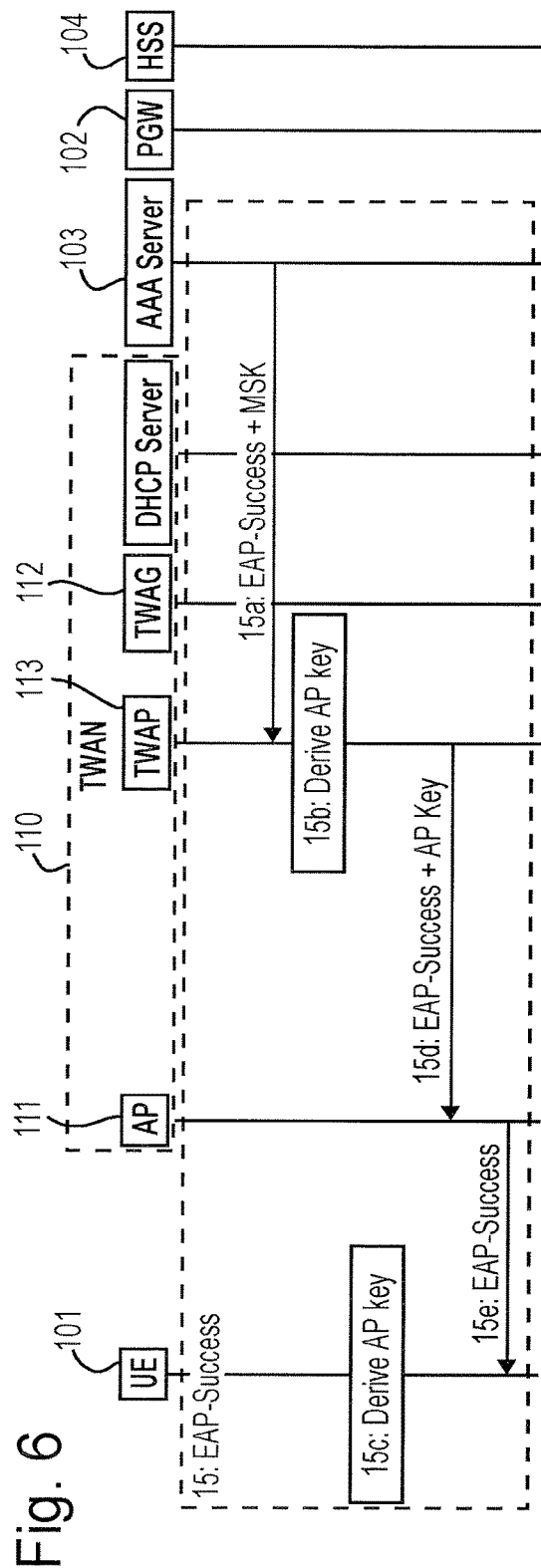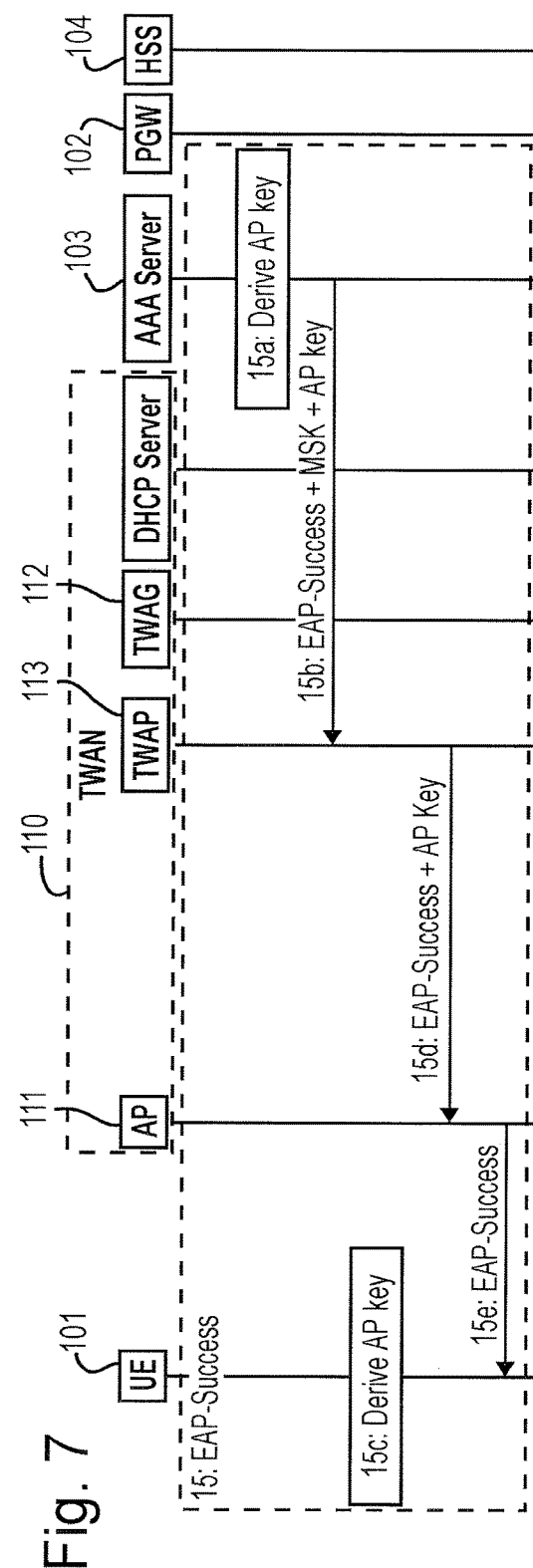

PROTECTING WLCP MESSAGE EXCHANGE BETWEEN TWAG AND UE

PRIORITY

This application is a continuation, under 35 U.S.C. § 120, of U.S. patent application Ser. No. 14/442,117 which is a U.S. National Stage Filing under 35 U.S.C. § 371 of International Patent Application Serial No. PCT/EP2015/058140, filed Apr. 15, 2015, and entitled "Protecting WLCP Message Exchange Between TWAG and UE" which claims priority to U.S. Provisional Patent Application No. 61/988,613, filed May 5, 2014, all of which are hereby incorporated by reference in their entirety.

TECHNICAL FIELD

The invention relates to methods and devices for protecting Wireless Local Area Network (WLAN) Control Protocol (WLCP) message exchange between a Trusted WLAN Access Gateway (TWAG) of a Trusted WLAN Access Network (TWAN) and a User Equipment (UE), as well as corresponding computer programs and computer program products.

BACKGROUND

A basic concept in the 3GPP Evolved Packet Core (EPC) architecture is the Packet Data Network (PDN). A PDN is an Internet Protocol (IP) network, e.g., the Internet, but it can also be a closed corporate network or an operator service network like an IP Multimedia Subsystem (IMS). A PDN has one or more names associated with it, each name being represented by a string called Access Point Name (APN). A PDN gateway (PDN-GW or PGW) is a functional node that provides access to one or more PDNs. For a description of the relevant background, reference is made to 3GPP Technical Specifications (TS), in particular TS 23.401 and TS 23.402.

A PDN Connection provides a User Equipment (UE) with an access channel to a PDN. It is a logical IP tunnel between the UE and the PGW. Each PDN Connection has a single IP address/prefix. A UE can setup multiple PDN Connections, possibly to the same APN.

In FIG. 1, the network architecture for integrating a Trusted WLAN Access Network (TWAN) 110 into an EPC network is illustrated. FIG. 1 is reproduced from TS 23.402 (rev 12.3.0, FIG. 16.1.1-1) and shows the non-roaming scenario. For roaming scenarios, reference is made to TS 23.402.

The internal architecture of the TWAN 110 is beyond the scope of 3GPP. However, 3GPP has defined a number of functions that need to be supported in the TWAN 110 in order to enable interworking with EPC networks and 3GPP UEs 101. In FIG. 2, also reproduced from TS 23.402 (rev 12.3.0, FIG. 16.1.2-1), TWAN functionality which is required for EPC interworking is illustrated. The required functions are:

A WLAN Access Network (WLAN AN). The WLAN AN includes a collection of one or more WLAN Access Points (AP) 111. An access point terminates the UE's WLAN IEEE 802.11 link.

A Trusted WLAN Access Gateway (TWAG) 112. This function terminates the S2a interface and forwards packets between the UE-TWAG link and the S2a tunnel for that UE and PDN Connection.

A Trusted WLAN Authentication, Authorization, and Accounting (AAA) Proxy (TWAP) 113. This function terminates the STa interface. It relays the AAA information between the WLAN AN and the 3GPP AAA Server 103 or Proxy which is deployed in the 3GPP network (the Home Public Land Mobile Network (HPLMN), in non-roaming scenarios).

There is a need for information exchange between the different TWAN functions, but since the internal TWAN architecture is beyond the scope of 3GPP, corresponding interfaces are not shown in FIG. 2. The TWAN functions may be implemented in different ways, both co-located as well as separate from each other.

According to 3GPP specifications, there exist two "scenarios" for how PDN Connections can be handled between the UE and the network in the case of TWAN. In the following, these scenarios are referred to as Single-Connection Mode (SCM) and Multi-Connection Mode (MCM).

In SCM, only a single IP session is supported per UE over WLAN. The UE uses the Extensible Authentication Protocol (EAP) to provide information pertaining to what kind of IP session it requests (e.g., by providing an APN).

In MCM, multiple simultaneous IP sessions per UE are supported over WLAN. In this mode, a new control protocol between the UE 111 and the TWAG 112, the WLAN Control Protocol (WLCP), is currently being specified by 3GPP to manage PDN Connections (see, e.g., TS 23.402 and TS 24.244). The WLCP is used to request establishment and disconnection of PDN Connections and to carry parameters associated with each PDN Connection, such as APN, PDN type, and the like. It has been agreed that WLCP is carried over the User Datagram Protocol (UDP)/IP.

A problem of the current solution is that there is no protection of the WLCP signaling between the UE 101 and the TWAG 112. Relying on existing 802.11 air-link protection of traffic, based on IEEE 802.11 standards, is associated with the problems described in the following.

The 802.11 air-link protection only covers the path between the UE 101 and the AP 111. Moreover, it is only based on using the Media Access Control (MAC) addresses of the UE 101 and the AP 111 as identifiers for the traffic. With WLCP, however, traffic is sent between the UE 101 and the TWAG 112, via the AP 111. Since IP packets sent over the 802.11 air-link are protected over the air-link, the UE 101 and the TWAG 112 could potentially authenticate the received WLCP message based on the source MAC address. This solution, however, relies on two assumptions:

The first assumption is that the AP 111, and the link between the AP 111 and the TWAG 112, are secure. If this is the case, it can be assumed that packets cannot be tampered with between the UE 101 and the TWAG 112 even if only the UE-AP link is integrity protected.

The second assumption is that the receiver can authenticate the packet based on the source MAC address.

The first assumption may hold in many cases, e.g., in operator deployed WLAN/WiFi networks. However, even in that case, the link between the AP 111 and the TWAG 112 may be accessible to third parties and difficult to protect from physical access.

The second assumption relies on that the receiver of the WLCP packet can use the MAC address to identify the sender of the message. In many systems, e.g., regular UE implementations of UDP clients, the MAC address is not available to a UDP application. Therefore, the WLCP software in the UE will not know the MAC address used to carry the message. Whilst it can be argued that this is an implementation issue since lower layers in the UE could pass the source MAC address to the higher (i.e., UDP) layers, this is a significant requirement to put on all operating systems, such as Android, iOS, and the like, and hampers deployment of WLCP.

SUMMARY

It is an object of the invention to provide an improved alternative to the above techniques and prior art.

More specifically, it is an object of the invention to provide an improved protection of WLCP signaling between the UE and the TWAG.

These and other objects of the invention are achieved by means of different aspects of the invention, as defined by the independent claims. Embodiments of the invention are characterized by the dependent claims.

According to a first aspect of the invention, a method of protecting WLCP message exchange between a TWAG of a TWAN and a UE is provided. The method comprises deriving, by an AAA Server of an EPC network which is interfaced with the TWAN, and by the UE, a Master Session Key (MSK) and an Extended MSK (EMSK), sending, from the AAA Server to a TWAP of the TWAN and an AP of the TWAN, the MSK or a key derived from at least the MSK, and deriving, by the TWAN or by the AAA Server, and by the UE, from the MSK, the EMSK, or the key derived from at least the MSK or the EMSK, a key for protecting the WLCP message exchange.

According to a second aspect of the invention, a method of protecting WLCP message exchange between a TWAG of a TWAN and a UE is provided. The method is performed collaboratively by one or more nodes implementing a TWAN, as is described throughout this disclosure. The method comprises receiving, by a TWAP of the TWAN and by an AP of the TWAN from an AAA Server of an EPC network which is interfaced with the TWAN, an MSK or a key derived from at least the MSK, and using a key derived from the MSK, the key derived from at least the MSK, the EMSK, or a key derived from at least the EMSK, for protecting the WLCP message exchange.

According to a third aspect of the invention, a method of protecting WLCP message exchange between a TWAG of a TWAN and a UE is provided. The method is performed by an AAA Server of an EPC network which is interfaced with the TWAN. The method comprises deriving an MSK and an EMSK, sending, to a TWAP of the TWAN and an AP of the TWAN, the MSK or a key derived from at least the MSK, and deriving from the MSK, the EMSK, or the key derived from at least the MSK or the EMSK, a key for protecting the WLCP message exchange.

According to a fourth aspect of the invention, a method of protecting WLCP message exchange between a TWAG of a TWAN and a UE is provided. The method is performed by the UE. The method comprises deriving an MSK and an EMSK, and deriving from the MSK, the EMSK, or the key derived from at least the MSK or the EMSK, a key for protecting the WLCP message exchange.

According to a fifth aspect of the invention, a computer program is provided. The computer program comprises computer-executable instructions for causing a device to perform the method according to any one of the first, second, third, or fourth, aspect of the invention, when the computer-executable instructions are executed on a processing unit comprised in the device.

According to a sixth aspect of the invention, a computer program product comprising a computer-readable storage medium is provided. The computer-readable storage medium has the computer program according to the fifth aspect of the invention embodied therein.

According to a seventh aspect of the invention, a TWAN node is provided. The TWAN node implements a TWAG of the TWAN and a TWAP of the TWAN. The TWAN node comprises processing means operative to receive, from an AAA Server of an EPC network which is interfaced with the TWAN, an MSK or a key derived from at least the MSK, and use a key derived from the MSK, the key derived from at least the MSK, an EMSK, or a key derived from at least the EMSK, for protecting the WLCP message exchange. Optionally, the TWAN node may further implement an AP of the TWAN, and may comprise a WLAN interface being operative to communicate with a UE.

According to an eight aspect of the invention, an AAA Server for an EPC network which is interfaced with a TWAN is provided. The AAA Spryer comprises processing means operative to derive an MSK and an EMSK, send the MSK or a key derived from at least the MSK to a TWAP of the TWAN and an AP of the TWAN, and derive, from the MSK, the EMSK, or the key derived from at least the MSK or the EMSK, a key for protecting WLCP message exchange between a TWAG of the TWAN and a UE communicating with the AP.

According to a ninth aspect of the invention, a UE is provided. The UE comprises a WLAN interface which is operative to communicate with an AP of a TWAN, and processing means. The processing means is operative to derive an MSK and an EMSK, and derive from the MSK, the EMSK, or the key derived from at least the MSK or the EMSK, a key for protecting WLCP message exchange with a TWAG of the TWAN.

Throughout this disclosure, it is assumed that a TWAN 110 is interfaced with, sometimes referred to as integrated into, an EPC network as a trusted non-3GPP access via the STa interface to the 3GPP AAA Server 103 and via the S2a interface to the PDN GW 102, as is described in section 16 of TS 23.402 and illustrated in FIG. 1.

The invention makes use of an understanding that protection may be provided as part of the WLCP protocol itself, thereby alleviating the need for secure deployment, relying on MAC addresses, or the like.

The proposed solutions take advantage of existing keying material, the MSK, the EMSK, or a key derived from at least the MSK or the EMSK, to derive new keying material for protecting the WLCP message exchange on the application layer between the TWAG and the UE, throughout this disclosure also referred to as WLCP key.

According to an embodiment of the invention, the MSK or the key derived from at least the MSK is sent from the TWAP or the AP to the TWAG, and the key for protecting the WLCP message exchange is derived by the TWAG from the MSK or the key derived from at least the MSK.

According to another embodiment of the invention, the key for protecting the WLCP message exchange is derived by the TWAP or by the AP, and subsequently sent from the TWAP or the AP, respectively, to the TWAG.

According to a further embodiment of the invention, the key for protecting the WLCP message exchange is derived by the AAA Server and by the UE from the EMSK or the key derived from at least the EMSK. The key for protecting the WLCP message exchange is sent from the AAA Server to the TWAP, and subsequently from the TWAP to the TWAG.

According to an embodiment of the invention, an AP key is derived by the TWAP and by the UE from the MSK or the key derived from at least the MSK, and sent from the TWAP to the AP. Further keys are derived by the AP and by the UE from the AP key for use by an 802.11 layer to protect an air-link between the AP and the UE.

According to another embodiment of the invention, an AP key is derived by the AAA Server and by the UE from the MSK or the key derived from at least the MSK, the AP key is sent from the AAA Server to the TWAP, and subsequently sent from the TWAP to the AP. Further keys are derived by the AP and by the UE from the AP key for use by an 802.11 layer to protect an air-link between the AP and the UE.

According to yet another embodiment of the invention, the key for protecting the WLCP message exchange is derived by the AAA Server from the MSK or the key derived from at least the MSK, and an AP key is derived by the AAA Server and by the UE from the MSK or the key derived from at least the MSK. The key for protecting the WLCP message exchange and the AP key are sent from the AAA Server to the TWAP. Subsequently, the key for protecting the WLCP message exchange is sent from the TWAP to the TWAG, and the AP key is sent from the TWAP to the AP. Further keys are derived by the AP and by the UE from the AP key for use by an 802.11 layer to protect an air-link between the AP and the UE.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which:

FIG. 6 illustrates deriving the AP key by the TWAP, in accordance with an embodiment of the invention.

FIG. 7 illustrates deriving the AP key by the AAA Server, in accordance with another embodiment of the invention.

All the figures are schematic, not necessarily to scale, and generally only show parts which are necessary in order to elucidate the invention, wherein other parts may be omitted or merely suggested.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 3:
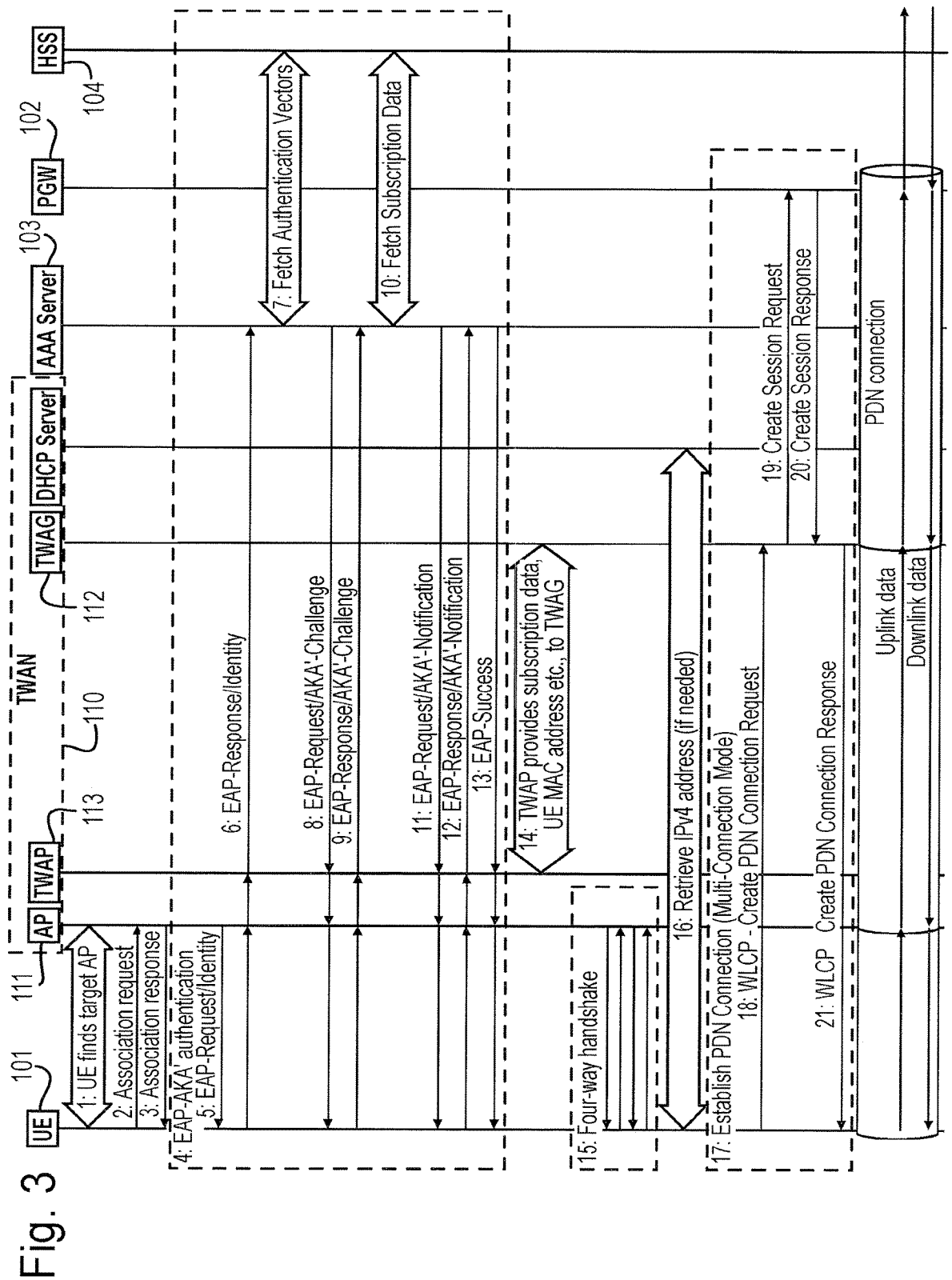
FIG. 3 illustrates initial attachment of a UE to a TWAN, as is known in the art.

The call flow shown in FIG. 3 illustrates how a UE 101 attaches to a TWAN 110, negotiates the use of Multi-Connection Mode (MCM), and establishes a PDN Connection. FIG. 3 is re-produced from TS 23.402 (rev 12.3.0), section 16.2 (FIG. 16.2.1-1), with some parts simplified for clarity and the authentication (block 4 in FIG. 3) expanded into individual steps. Note that step 14 may be performed after block 4, i.e., triggered by successful authentication, or may be performed during block 4, e.g., by an extra authentication as described in change request C4-140308, "STa Authentication for Trusted WLAN access", 3GPP TSG CT4 Meeting #64, Guangzhou, The People's Republic of China, 20-24 Jan. 2014. The detailed steps of the authentication, as shown in block 4 of FIG. 3, can also be found in TS 33.402, section 6.2 (rev 12.3.0). More specifically, the steps shown in block 4 of FIG. 3 correspond to steps 2-5 and 10-24 of FIG. 6.2-1 in TS 33.402. After the procedure shown in FIG. 3 has finished, the UE 101 may establish additional PDN Connections by executing the steps in block 17 of FIG. 3 again, e.g., for a different APN.

The current EAP authentication method used by a TWAN 110 to mutually authenticate the UE 101 and the EPC network, and to derive keys for protection on the 802.11 air-link, is EAP-AKA', which is specified in RFC 5448 ("Improved Extensible Authentication Protocol Method for 3rd Generation Authentication and Key Agreement (EAP-AKA')"). The basic principle in all current EAP methods for SIM-based authentication, i.e., EAP-SIM, EAP-AKA, and EAP-AKA', is similar: an MSK is generated both in the UE and in the AAA Server, and provided from the AAA Server to the WLAN AP. The UE and the AP then execute the four-way handshake (block 15 in FIG. 3) to derive keying material from the MSK for the 802.11 air-link protection. Note that the AP 111 is one possible entity in the WLAN AN which can perform the actions described in this disclosure, and it will be appreciated that the same tasks may be performed by other entities of the WLAN AN.

The MSK, as well as the Extended MSK (EMSK), are generated from CK' and IK', as is known in the art (see, e.g., TS 33.402, section 6.2, and RFC 5448). More specifically, CK' and IK' are generated by the Home Subscriber Server (HSS) 104 and provided to the AAA Sever 103, as part of the authentication vector (block 7 of FIG. 3), and independently by the Universal Subscriber Identity Module (USIM) application in the UE 101. The USIM application is typically provided on a Universal Integrated Circuit Card (UICC), the so-called SIM card.

In the following, embodiments of the invention are described with reference to FIG. 4, which illustrates a call flow for EAP authentication, including the (state-of-the-art) key derivation for 802.11 air-link protection and the proposed key derivation for WLCP protection.

Figure 4:
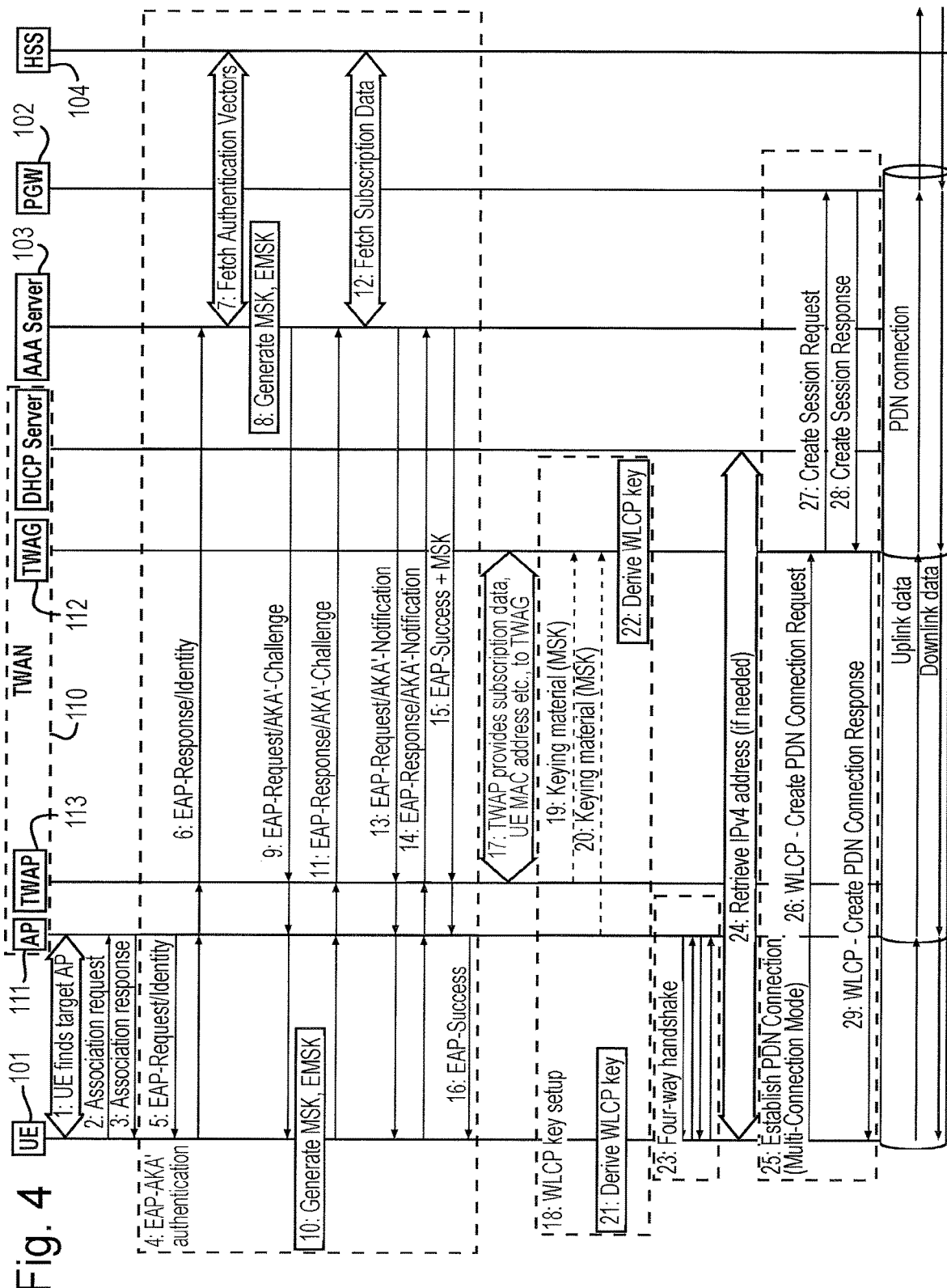
FIG. 4 illustrates initial attachment of a UE to a TWAN, in accordance with an embodiment of the invention.

According to current 3GPP specifications, and shown in block 4 of FIG. 4, the EAP-AKA' procedure is performed between the UE 101 and the AAA Server 103 to derive the MSK and the EMSK according to RFC 5448 at the UE 101 (step 10 in FIG. 4) and the AAA Server 103 (step 8 in FIG. 4) (see 3GPP TS 33.402, section 6.2, steps 12 and 15, respectively). In step 15 of FIG. 4, the MSK is provided from the AAA Server 103 to the TWAP 113 and the AP 111.

Note that, throughout the present disclosure, keying material derived from at least the MSK may be provided from the AAA Server 103 to the TWAP 113 and the AP 111 instead of the MSK itself. For instance, the keying material may be the MSK itself, i.e., key=MSK, it may be obtained by truncation, e.g., using the Least Significant Bits only, key=LSBs (MSK, 32), it may be obtained through a Key Derivation Function (KDF), e.g., key=KDF (MSK), it may be a subset in the strictest sense of the word, e.g., bits number 3, 27, 43, 53, 54, . . . , of the MSK, or the like.

Note that EAP messages sent between the AAA Server 103 and the UE 101 are typically encapsulated and carried by another protocol. Between the AAA Server 103 and the TWAN 110, i.e., between the AAA Server 103 and the TWAP 113 as well as between the TWAP 113 and the AP 111, Diameter or RADIUS are frequently used, whereas EAPoL (EAP over LANs) is typically used between the AP 111 and the UE 101. Such carrier protocols may also carry other information elements. For example, charging information may be exchanged between the AAA Server 103 and the TWAP 113 and/or the AP 111. The MSK, or a key derived from at least the MSK, is sent from the AAA Server 103 to the TWAP 113 and/or the AP 111 on the carrier protocol level. Thus, in step 15, the MSK is not included in the EAP-Success information element but is instead included in other information element(s). Also, note that the MSK is not sent to the UE 101 in step 16 but derived by the UE 101 in step 10.

During the four-way handshake, block 23 in FIG. 4, the UE 101 and the AP 111 derive keys from the MSK which are used by the 802.11 layer to protect the air-link.

Embodiments of the invention utilize the MSK, the EMSK, or a key derived from at least the MSK or the EMSK, to also derive a WLCP key, also referred to as WLCP session key, for protecting WLCP signaling between the TWAG 112 and the UE 101.

According to a first embodiment, shown in block 18 in FIG. 4, the MSK, or keying material derived from at least the MSK is provided to the TWAG 112 in step 19 or 20, respectively. For example, the keying material may be the MSK itself, obtained by truncation or through a KDF, or a subset of the MSK.

The MSK, or keying material derived from at least the MSK, may be sent from the TWAP 113 to the TWAG 112 in step 19. Optionally, step 19 may be combined with step 17. Alternatively, the MSK, or keying material derived from at least the MSK, may be sent from the AP 111 to the TWAG 112 in step 20. For instance, the radio head-end of the AP 111 may be controlled by a central node, the Access Controller (AC) (not illustrated in the figures), and the AP 111 and the AC communicate via the Control And Provisioning of Wireless Access Points (CAPWAP) protocol. If the AC and the TWAG 112 are co-located, the MSK can be sent to the TWAG 112 via CAPWAP.

In steps 21 and 22, the UE 101 and the TWAG 112 independently derive a key that can be used to protect the WLCP traffic. This key, called the WLCP key, is derived from the MSK, or from keying material derived from at least the MSK, obtained by the TWAG 112 in step 19 or 20. Since the MSK is derived from an EAP-AKA, EAP-AKA' or EAP-SIM run, the derived keying material, and the WLCP key, will be fresh. Thereby, replay-types of attacks are hampered. The keying material may be bound to an identifier associated with the TWAG 112, as is known in the art, in order to mitigate the risk that one TWAG impersonates another TWAG towards the UE 101.

Figure 5:
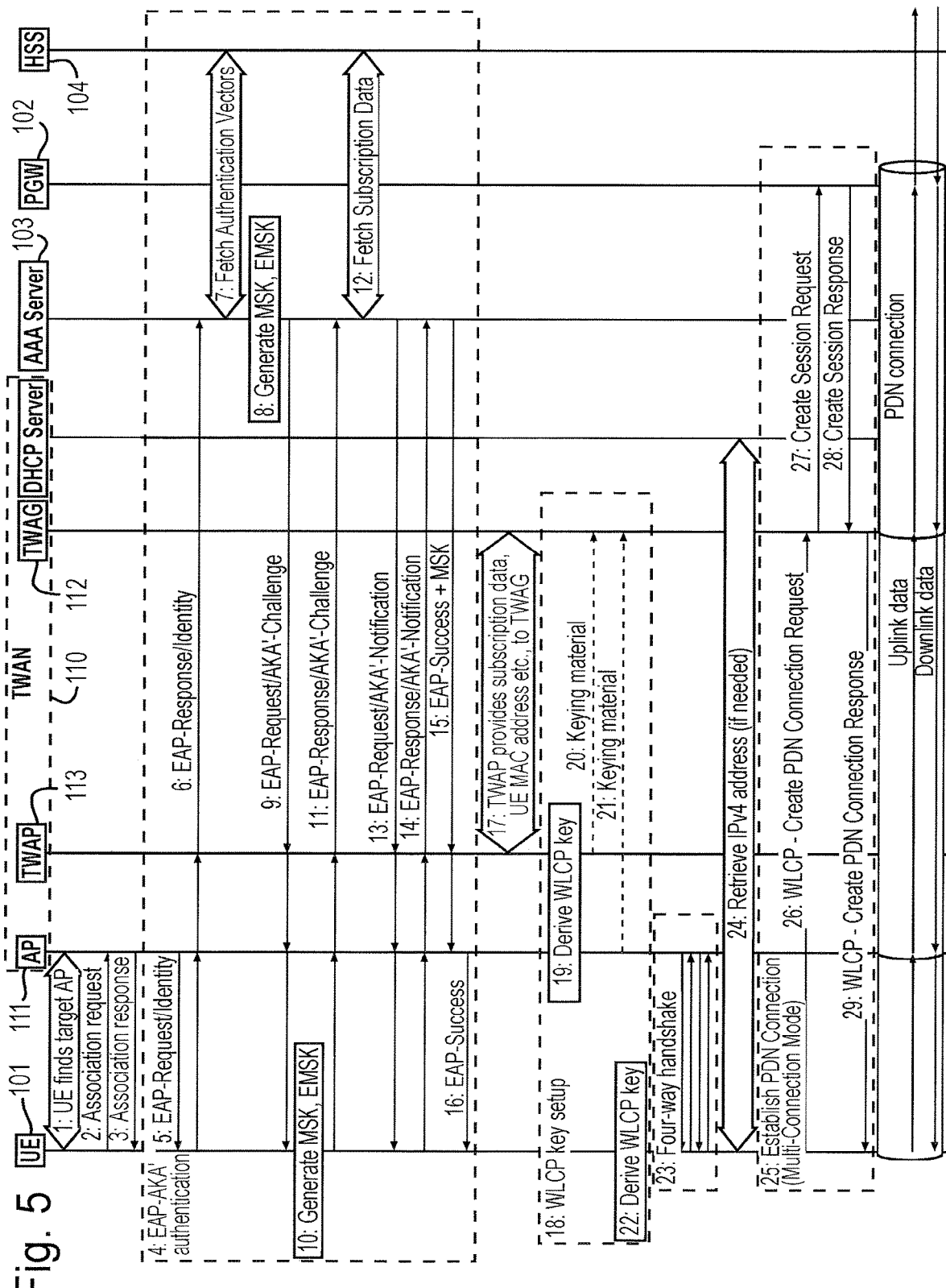
FIG. 5 illustrates initial attachment of a UE to a TWAN, in accordance with another embodiment of the invention.

A second embodiment, which is illustrated in FIG. 5, is similar to the first embodiment but differs from the first embodiment in that step 19, deriving the WLCP key, is not performed by the TWAG 112 but by the TWAP 113 or by the AP 111. In this case, the WLCP key is sent to the TWAG 112 in step 20, if generated by the TWAP 113, or in step 21, if generated by the AP 111.

The WLCP key may be derived using a KDF, e.g., WLCP key=KDF (MSK, input parameter(s)). Instead of the MSK, keying material derived from at least the MSK may be used. The input parameters may be any information available to the entities deriving the WLCP key and which renders the derived WLCP key unique. For instance, a TWAG identifier may be used as input parameter, such as the TWAG IP address (delivered to the UE 101 in EAP) or the TWAG MAC address, which may be discovered via Address Resolution Protocol (ARP)/Neighbor Discovery (ND).

Common to both embodiments is that the TWAG 112 and the UE 101 can derive further keys, e.g., for encryption and integrity protection. The WLCP messages are then protected using the derived further key(s), e.g., the PDN Connection Request and Response messages in steps 26 and 29.

There are multiple ways the derived keys can be used to protect WLCP traffic. One example is to use Datagram Transport Layer Security (DTLS) with a pre-shared-key cipher suite. In this case, the pre-shared key would be related to the WLCP key. An alternative is to integrate security in the WLCP protocol itself. This can be done, e.g., by including a sequence number in each WCLP message, using the WLCP key to compute a Message Authentication Code (MAC) for each message, and then append the MAC to the message before transmitting it. The receiver can verify that the MAC is correct upon reception.

Further, encryption can also be added. The algorithm(s) to use for encryption may be negotiated during the DTLS handshake, if DTLS is used. If security is built into the WLCP protocol itself, then a mechanism to agree on which algorithm(s) to use may be added to the WLCP protocol. An example of such mechanism is that the UE 101 informs the TWAG 112 about which algorithms it supports, and the TWAG 112 makes a choice based on this information. For instance, the TWAG 112 may return a list of algorithms which the UE 101 supports to the UE 101 in an integrity protected message. The UE 101 can then verify that the list has not been manipulated during transmission. Yet a further alternative is that encryption algorithms are pre-configured or defined in standardization.

Note that the steps in block 18 of FIGS. 4 and 5, the WLCP key setup, may be performed at any time when the MSK is known to the TWAP 113 or the AP 111, but before block 25 starts. For example, block 18 may be performed after the four-way handshake in block 23.

When a re-authentication is performed, the AAA Server 103 and the UE 101 re-use keys derived during the previous full authentication to generate a new MSK. As part of the re-authentication process, the new MSK, or keying material derived from at least the MSK, is also delivered to the TWAP 113 and the AP 111. The UE 101 and the AP 111 then execute the four-way handshake to negotiate new keying material for the 802.11 air-link protection. After the re-authentication process, the WLCP keys may also be renewed. One way to accomplish this is to re-execute block 18 described above with reference to FIGS. 4 and 5 at every re-authentication. In this approach, and when step 22 in FIG. 4 is performed by the TWAG 112, the TWAG 112 needs to be informed by the TWAP 113 or the AP 111 that a re-authentication has occurred. Such notification would also include the new MSK, or keying material derived from at least the MSK.

Another way is to add a re-keying mechanism to the WLCP protocol. A new WLCP message is sent from TWAG 112 to UE 101 indicating when to switch to the new key established during re-authentication.

According to the state of the art, the MSK is provided to the AP 111 in step 15 of FIGS. 4 and 5. The MSK will be used for the four-way handshake between the UE 101 and the AP 111 in block 23. However, since the link between the TWAP 113 and the AP 111 may be insecure, and/or the MSK might be fetched from a compromised AP, an adversary may be able to acquire the key and derive the WLCP key. Therefore, it may be advantageous to refrain from sending the MSK to the AP 111.

Hence, according to a third embodiment, the TWAP 113 may derive a further key, called AP key, from the MSK, or keying material derived from at least the MSK, which is then sent to the AP 111. In order to accomplish this, step 15 in FIGS. 4 and 5 is divided into several sub-steps which are described in the following with reference to FIG. 6. Note that the UE 101 may derive the AP key at any time before the four-way handshake (block 23 of FIGS. 4 and 5).

In step 15*b* shown in FIG. 6, after the TWAP 113 has received the MSK or keying material derived from at least the MSK in step 15*a*, it derives the AP key. The AP key is derived in such a way that it can also be derived by the UE 101 in step 15*c*. In step 15*d*, the TWAP 113 sends the AP key to the AP 111. In step 23, in FIGS. 4 and 5, during the four-way handshake, the UE 101 and the AP 111 derive keys from the AP key for use by the 802.11 layer to protect the air-link.

According to a fourth embodiment, illustrated in FIG. 7, the AP key may be derived from the MSK, or keying material derived from at least the MSK, in step 15*a* by the AAA Server 103 instead of the TWAP 113. In this case, the AAA Server 103 sends the MSK, or keying material derived from at least the MSK, and the AP key to the TWAP 113 in step 15*b*, and the TWAP 113 only sends the AP key to the AP 111 in step 15*d*. The UE 101 derives the same AP key in step 15*c*.

The AP key may be derived using a KDF, e.g., AP key=KDF (MSK, input parameter(s)). Instead of the MSK, keying material derived from at least the MSK may be used. The input parameters may be any information available to the entities deriving the AP key and which renders the derived AP key unique. For instance, the Service Set Identifier (SSID), the Basic Service Set Identifier (BSSID), or the Homogenous Extended Service Set Identifier (HESSID), of the AP may be used as input parameters.

According to a fifth embodiment, the WLCP key and the AP key may be derived from the MSK, or keying material derived from at least the MSK, by the AAA Server 103 in step 15*a*, according to the key derivation mechanisms described for previous embodiments, in particular with reference to FIG. 7. The AAA Server 103 would then send the AP key and the WLCP key to the TWAP 113 in step 15*b*, and the TWAP 113 sends the WLCP key to the TWAG 112 and the AP key to the AP 111 in step 15*d*. The UE 101 derives the WLCP key and the AP key accordingly in step 15*c*.

According to a sixth embodiment, the WLCP key may be derived from the EMSK, or keying material derived from at least the EMSK, by the AAA Server 103 in step 15*a*, according to the key derivation mechanisms described for previous embodiments, in particular with reference to FIGS. 6 and 7. The EMSK is a key similar to the MSK and is derived by the UE 101 and the AAA Server 103 at the same time as the MSK. It is currently used for IP-based mobility and is described in 3GPP TS 33.402, section 6.2. The AAA Server 103 would then send the WLCP key and the MSK to the TWAP 113 in step 15*b*, and the TWAP 113 sends the WLCP key to the TWAG 112 in step 15*d* and the MSK to the AP 111. The UE 101 derives the WLCP key accordingly in step 15*c*.

In order to elucidate the sixth embodiment even further, deriving the WLCP key from the EMSK by the AAA Server 103 and the UE 101 is described in further detail in the following and illustrated in FIG. 8.

Figure 1:
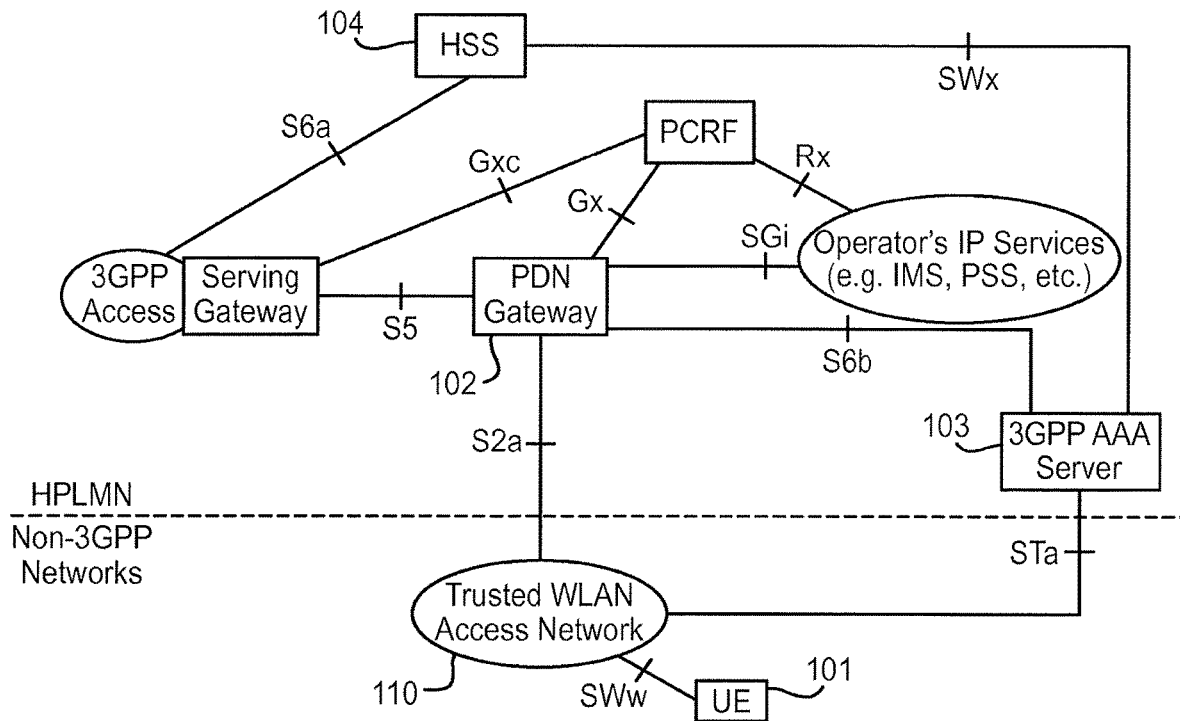
FIG. 1 shows the non-roaming architecture for TWAN access to an EPC network, in accordance with an embodiment of the invention.
Figure 2:
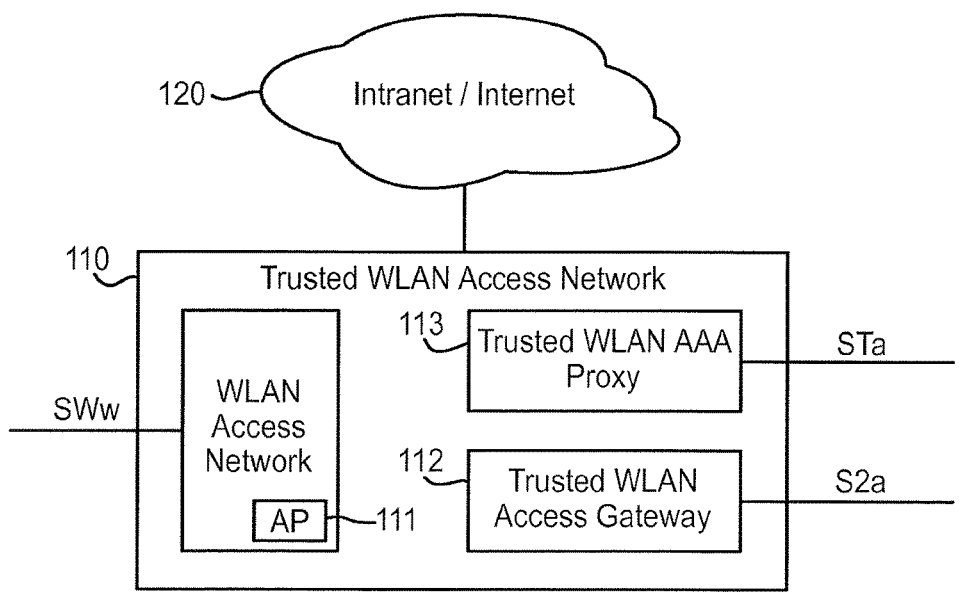
FIG. 2 shows the functional units of a TWAN, in accordance with another embodiment of the invention.

To this end, with reference to FIGS. 1 and 2, a TWAN 110 is interfaced with the EPC network as a trusted non-3GPP access via the STa interface to the 3GPP AAA Server 103 and via the S2a interface to the PDN GW 102, as is described in section 16 of TS 23.402.

Further with reference to section 16 of TS 23.402, there are three connection modes for TWAN (Single-Connection Mode, Multi-Connection mode and Transparent Single-Connection Mode), and the negotiation of the connection mode takes place during the EAP-AKA' access authentication.

In case Single-Connection Mode or Transparent Single-Connection Mode was negotiated during EAP-AKA' access authentication, authentication and key agreement as described in section 6.2 of TS 33.402 shall be used.

In case Multi-Connection Mode was negotiated during EAP-AKA' access authentication, the WLCP is used between the UE 101 and the TWAG 112 to control, e.g., setup and teardown, PDN Connections over a TWAN access. In this case, authentication and key agreement as described in section 6.2 of TS 33.402 shall be used, with the following exceptions and additions.

Figure 8:
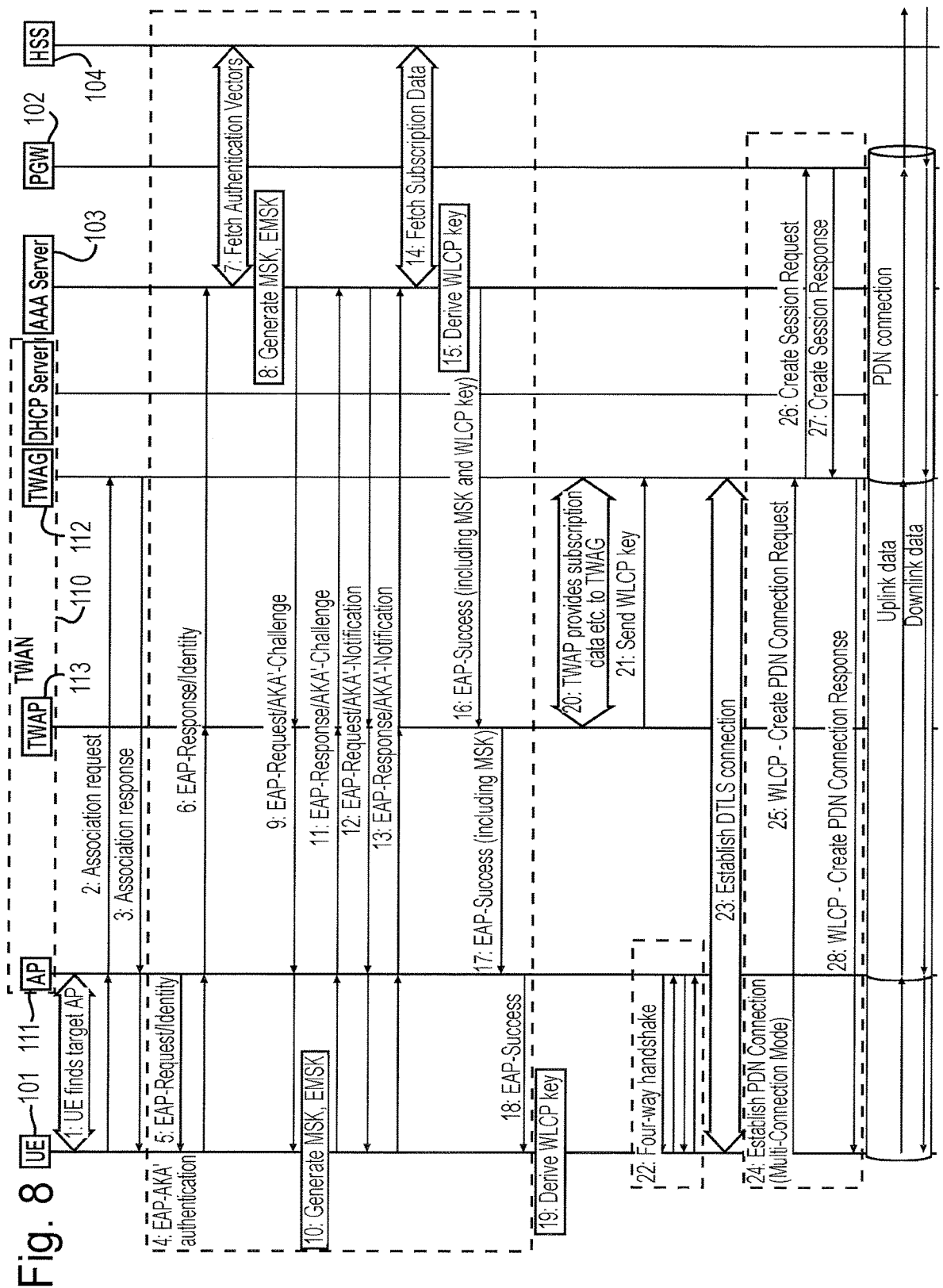
FIG. 8 illustrates initial attachment of a UE to a TWAN, in accordance with a further embodiment of the invention.

First, steps 1-14 in FIG. 8 are performed. These steps correspond to steps 1-22A described in section 6.2 of TS 33.402. As a result, the UE 101 and the AAA Server 103 are in possession of the MSK and the EMSK, derived from CK' and IK' according to RFC 5448, by the AAA Server 103 in step 8 and, independently, by the UE 101 in step 10.

Then, in step 15 the AAA Server 103 derives the WLCP key from the EMSK similar to what is described hereinbefore for deriving the WLCP key from the MSK. More specifically, the WLCP key may be derived using a KDF, e.g., WLCP key=KDF (EMSK, input parameter(s)). Instead of the EMSK, keying material derived from at least the EMSK may be used. The input parameters may be any information available to the entities deriving the WLCP key and which renders the derived WLCP key unique. For instance, a TWAG identifier may be used as input parameter, such as the TWAG IP address (delivered to the UE in EAP) or the TWAG MAC address, which may be discovered via ARP/ND.

In step 16, the AAA Server 103 sends the EAP-Success message to the TWAP 113 in the TWAN 110, optionally preceded by an EAP-Notification, as explained in step 19 described in section 6.2 of TS 33.402. The AAA Server 103 also includes the MSK and the WLCP key in the underlying AAA protocol message, i.e., not at the EAP level.

In step 21, upon receiving the EAP-Success message, the MSK and the WLCP key, the TWAP 113 provides the WLCP key to the TWAG 112 to be used for protecting the WLCP signaling between the UE 101 and TWAG 112. This step may also happen after, or in parallel with, steps 17-19.

In step 17, the TWAP 113 forwards the EAP-Success message to the authenticator in the in the WLAN AN, i.e., the AP 111, optionally preceded by an EAP-Notification, as is explained in section 6.2 of TS 33.402 in relation to step 19. The TWAP 113 also includes the MSK in the underlying AAA protocol message, i.e., not at the EAP level. The AP 111 stores the keying material to be used in communication with the authenticated UE 101, as required by the WLAN AN.

In step 18, the AP 111 informs the UE 101 about the successful authentication with the EAP-Success message.

In step 19, the UE 101 derives the WLCP key from the EMSK in a similar manner as the as the AAA Server 103 in step 15. This can happen as soon as the authentication process was completed successfully, i.e., after EAP Success was received or after optional EAP' AKA Notification was received in step 12.

Now the EAP AKA' exchange has been successfully completed, and the UE 101 and the AP 111 share keying material derived during that exchange, and the UE 101 and AP 111 can perform the four-way handshake (block 22 in FIG. 8).

In case of fast re-authentication, embodiments of the invention work in accordance with section 6.3 of TS 33.402, with the exception that new keys are derived in accordance with what is described herein.

Optionally, the WLCP signaling between the UE 101 and the TWAG 112 used for establishing PDC Connections may be protected by means of DTLS, using a pre-shared key as defined in RFC 6347. The key used for DTLS is the WLCP key, derived by the UE 101 and the AAA Server 103 as is described hereinbefore. In this case, the UE 101 establishes a DTLS connection with the TWAG 112 after successful authentication in case of Multi-Connection Mode. The UE 101 and the TWAG 112 shall support DTLS as defined in RFC 6347, and according to the TLS profile given in Annex E of TS 33.310.

Embodiments of the invention may be implemented in devices which, according to 3GPP specifications, are referred to as UE, AP, TWAP, TWAG, AAA Server, and the like, as illustrated in FIGS. 1 and 2. Such devices comprise a network interface and processing means, such as a processor and a memory storing executable instructions, i.e., computer programs, adapted to perform embodiments of the methods described hereinbefore. The network interface may comprise any known interface circuitry operative to transmit and receive data over a communications network, e.g., Ethernet, WLAN, or a 3GPP network such as Global System for Mobile Communications (GSM), Universal Mobile Telecommunications System (UMTS), or Long Term Evolution (LTE). The processing means may comprise a processing circuit including one or more microprocessors, microcontrollers, hardware circuits, or a combination thereof. The memory may comprise both non-volatile memory, e.g., read-only memory (ROM) and Flash memory, for storing the computer program and data needed for operation, and volatile memory, e.g., Random Access Memory (RAM), for storing temporary data.

Figure 9:
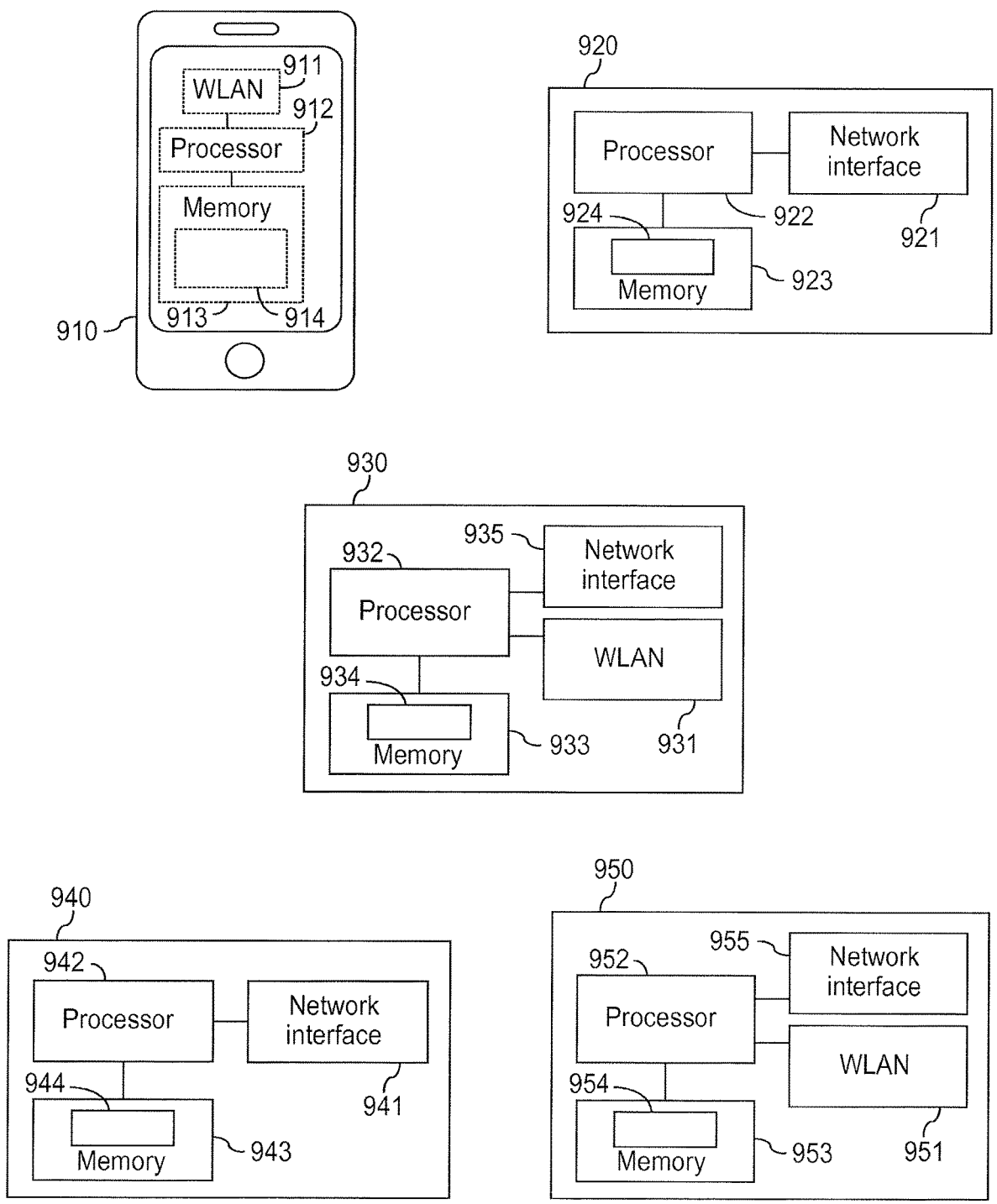
FIG. 9 shows devices, in accordance with embodiments of the invention.

As an example, an embodiment 910 of the UE 101 is shown in FIG. 9. The UE 910 comprises a WLAN interface 911, a processor 912, and a memory 913 storing executable instructions 914 adapted to perform embodiments of the methods described hereinbefore. The UE 910 may comprise additional network interfaces for effecting wireless communications over a 3GPP network.

As another example, an embodiment 920 of the AAA Server 103 is shown in FIG. 9. The AAA Server 920 comprises a network interface 921, a processor 922, and a memory 923 storing executable instructions 924 adapted to perform embodiments of the methods described hereinbefore.

With respect to the TWAN 110, it is noted that the functional entities shown in FIG. 2, the TWAP 113, the TWAG 112, and the WLAN AN (comprising at least one AP 111), have been defined by 3GPP for the purpose of describing required functionality related to message exchange between the EPC network (comprising the AAA Server 103), the TWAN 110, and the UE 101. It will be appreciated that these functional entities may be implemented as separate units, devices, nodes, or the like, or co-located. For instance, en embodiment 930 of the TWAN 110 may implement all functional entities, i.e., the TWAP 113, the TWAG 112, and at least one AP 111, in a single node. Such a TWAN node 930 comprises a WLAN interface 931, at least one further network interface 935 for communicating over the S2a and STa interfaces, a processor 932, and a memory 933 storing executable instructions 934 adapted to perform embodiments of the methods described hereinbefore.

As an alternative, the functional entities of the TWAN 110 may be implemented as separate nodes. For instance, the TWAP 113 and the TWAG 112 may be implemented in a first TWAN node 940, and the AP 111 is implemented as a second node 950. The first TWAN node 940 comprises at least one network interface 941 for communicating with the EPC network (over the S2a and STa interfaces) and with the second TWAN node 950, respectively, a processor 942, and a memory 943 storing executable instructions 944 adapted to perform embodiments of the methods described hereinbefore. The AP 950 comprises a WLAN interface 951, a further network interface 955 for communicating with the first TWAN node 940, a processor 952, and a memory 953 storing executable instructions 954 adapted to perform embodiments of the methods described hereinbefore. Optionally, the first TWAN node 940 may serve as an AC controlling one more APs 950, i.e., via CAPWAP.

As yet a further alternative, the TWAP 113, the TWAG 112, and the AP 111, may be implemented as separate nodes, each node comprising a network interface for communicating with the other nodes and/or the EPC network, a processor, and a memory storing executable instructions adapted to perform embodiments of the methods described hereinbefore. The node implementing the AP 111 additionally comprises a WLAN interface.

The person skilled in the art realizes that the invention by no means is limited to the embodiments described above. On the contrary, many modifications and variations are possible within the scope of the appended claims.

The invention claimed is:

1. A User Equipment (UE) comprising:
 a Wireless Local Area Network (WLAN) interface configured to communicate with an Access Point (AP) of a Trusted WLAN Access Network (TWAN); and
 processing circuitry configured to:
  derive a Master Session Key (MSK) and an Extended MSK (EMSK);
  derive from the MSK, the EMSK, or a key derived from at least the MSK or the EMSK, a WLAN Control Protocol (WLCP) key for protecting WLCP message exchange with a Trusted WLAN Access Gateway (TWAG) of the TWAN; and
  protect WLCP message exchange between the UE and the TWAG using a key for Datagram Transport Layer Security (DTLS), wherein the key used for DTLS comprises the WLCP key or a key derived from the WLCP key.

2. The UE according to claim 1, wherein the processing circuitry is configured to derive the WLCP key for protecting the WLCP message exchange from the EMSK or the key derived from at least the EMSK.

3. The UE according to claim 1, wherein the processing circuitry is further configured to:
   derive an AP key from the MSK or the key derived from at least the MSK; and
   derive keys from the AP key for use by an 802.11 layer to protect an air-link between the AP and the UE.

4. A method in a User Equipment (UE) comprising:
   deriving a Master Session Key (MSK) and an Extended MSK (EMSK);
   deriving from the MSK, the EMSK, or a key derived from at least the MSK or the EMSK, a Wireless Local Area Network (WLAN) Control Protocol (WLCP) key for protecting WLCP message exchange with a Trusted WLAN Access Gateway (TWAG) of a Trusted WLAN Access Network (TWAN); and
   protecting WLCP message exchange between the UE and the TWAG using a key for Datagram Transport Layer Security (DTLS), wherein the key used for DTLS comprises the WLCP key or a key derived from the WLCP key.

5. The method of claim 4, wherein the WLCP key for protecting the WLCP message exchange is derived from the EMSK or the key derived from at least the EMSK.

6. The method of claim 4, comprising:
   deriving an Access Point (AP) key from the MSK or the key derived from at least the MSK; and
   deriving keys from the AP key for use by an 802.11 layer to protect an air-link between the AP and the UE.

\* \* \* \* \*